(12) United States Patent
Xin

(10) Patent No.: US 12,385,612 B1
(45) Date of Patent: Aug. 12, 2025

(54) DYNAMIC LUNAR ECLIPSE LAMP

(71) Applicant: Yuanting Xin, Shenzhen (CN)

(72) Inventor: Yuanting Xin, Shenzhen (CN)

( * ) Notice: Subject to any disclaimer, the term of this patent is extended or adjusted under 35 U.S.C. 154(b) by 0 days.

(21) Appl. No.: 19/006,434

(22) Filed: Dec. 31, 2024

(30) Foreign Application Priority Data

Jun. 28, 2024 (CN) .......................... 202421519214.5

(51) Int. Cl.
| | |
|---|---|
| *F21S 10/00* | (2006.01) |
| *F21V 5/00* | (2018.01) |
| *F21V 5/04* | (2006.01) |
| *F21V 14/06* | (2006.01) |
| *F21V 14/08* | (2006.01) |
| *F21W 121/00* | (2006.01) |
| *G09B 23/00* | (2006.01) |
| *G09B 27/00* | (2006.01) |

(52) U.S. Cl.
CPC .............. *F21S 10/00* (2013.01); *F21V 5/008* (2013.01); *F21V 14/06* (2013.01); *B60Q 2400/50* (2013.01); *F21S 10/007* (2013.01); *F21V 5/045* (2013.01); *F21V 14/065* (2013.01); *F21V 14/08* (2013.01); *F21V 14/085* (2013.01); *F21W 2121/008* (2013.01); *G09B 23/00* (2013.01); *G09B 27/00* (2013.01)

(58) Field of Classification Search
CPC .. F21W 2121/008; F21S 10/00; F21S 10/007; F21V 14/06; F21V 14/065; F21V 14/08; F21V 14/085; G09B 27/00; G09B 23/00; B60Q 2400/50
See application file for complete search history.

(56) References Cited

U.S. PATENT DOCUMENTS

| | | | |
|---|---|---|---|
| 2018/0320857 A1* | 11/2018 | Belliveau | F21V 5/007 |
| 2023/0041557 A1* | 2/2023 | Lee | A61J 17/1011 |

\* cited by examiner

*Primary Examiner* — Colin J Cattanach
(74) *Attorney, Agent, or Firm* — JEEN IP LAW, LLC

(57) ABSTRACT

A dynamic lunar eclipse lamp is provided, which includes a blocking piece including a transparent area and a circular opaque area, the opaque area is provided at a non-central position of the blocking piece; an imaging lens provided on one side of the blocking piece, one end of the imaging lens is provided with a Fresnel lens, a non-central position on the Fresnel lens is provided with an image, and the imaging lens is configured to project the image onto a non-central position on the blocking piece, a position of the image projected by the imaging lens corresponds to a position of the opaque area on the blocking piece; a rotary drive component connected to the Fresnel lens and configured to drive the Fresnel lens to rotate; and a light source component, the lamp is caused to form a lunar eclipse effect, a crescent or a half-moon display effect.

8 Claims, 5 Drawing Sheets

DYNAMIC LUNAR ECLIPSE LAMP

CROSS-REFERENCE TO RELATED APPLICATIONS

This application claims priority to Chinese Patent Application No. 202421519214.5, filed on Jun. 28, 2024, which is hereby incorporated by reference in its entirety.

TECHNICAL FIELD

The present disclosure relates to the field of lamp technologies, and in particular, to a dynamic lunar eclipse lamp.

BACKGROUND

In the development process of human society, lamps play a crucial role as lighting tools. From the initial torches and oil lamps to various modern lighting fixtures today, lighting technology has undergone a long evolution.

With a continuous advancement of technology and an increasing living standard of people, the demand for lighting fixtures is no longer limited to providing basic lighting functions. In modern living and working environments, the quality, energy efficiency, lighting effect, intelligent control, and environmental performance of the lighting fixtures have received increasing attention.

Traditional lighting fixtures have the following problems: single lighting function, lack of dynamic display function, and cannot meet people's demand for personalized lighting. In order to overcome the shortcomings of traditional lighting fixtures and meet people's pursuit of high-quality lighting and personalized life, the present disclosure proposes a dynamic lunar eclipse lamp to solve the problem.

SUMMARY

Considering at least one of the above technical issues, the present application provides a dynamic lunar eclipse lamp that adopts the following technical solution to solve the problem of traditional lamps having a single lighting function, lacking dynamic display function, and unable to meet people's personalized lighting needs.

According to one aspect of the present application, a dynamic lunar eclipse lamp is provided, which includes:
  a blocking piece including a transparent area and a circular opaque area, where the opaque area is provided at a non-central position of the blocking piece;
  an imaging lens provided on one side of the blocking piece, and one end of the imaging lens is provided with a Fresnel lens configured to image, a non-central position of the Fresnel lens is provided with an image, and the imaging lens is configured to project the image onto a non-central position on the blocking piece; a position of the image projected by the imaging lens corresponds to a position of the opaque area on the blocking piece;
  a rotary drive component, which is connected to the Fresnel lens and configured to drive the Fresnel lens to rotate; and
  a light source component configured to project a light spot onto the Fresnel lens.

Through the above technical solution, s lunar eclipse effect can be formed, and a s crescent or a half-moon display effect can be created. This effect is constantly changed due to a driving force of the rotary drive component, thus achieving a dynamic lunar eclipse display effect.

In some embodiment of the present disclosure, the rotary drive component includes a gear plate, the gear plate is rotatably connected to a bracket, and the gear plate is connected to a motor through gear transmission;
  the Fresnel lens is fixed on the gear plate through a fixing ring.

The above technical solution can achieve a rotation of a lunar image.

In some embodiment of the present disclosure, a middle of the gear plate is provided with a through hole, and the Fresnel lens is fixed at a position of the through hole.

The above technical solution renders the Fresnel lens to be more stable.

In some embodiment of the present disclosure, one side of the gear plate is meshed and connected with a reduction gear; the reduction gear includes a small diameter gear and a large diameter gear of a coaxial integrated structure, where the small diameter gear is meshed and connected with the gear plate, and the large diameter gear is meshed and connected with a transmission gear, the transmission gear is connected to an output shaft of the motor.

The above technical solution can enable the motor to stably drive the gear plate to rotate, with smooth transmission, compact structure, reliable operation, and long service life.

In some embodiment of the present disclosure, the light source component includes a spotlight lens, the spotlight lens is provided on one side of the Fresnel lens, one side of the spotlight lens is provided with a lamp bead, and the spotlight lens is configured to gather light of the lamp bead.

The above technical solution can concentrate light and project it onto the Fresnel lens.

In some embodiment of the present disclosure, one side of the spotlight lens is provided with a spotlight cup, and the lamp bead is provided in a middle of the spotlight cup.

Through the above technical solution, a second focusing can be carried out to form a more stable light spot effect.

In some embodiment of the present disclosure, the lamp bead is fixedly installed on an aluminum substrate.

The above technical solution helps to dissipate heat from the lamp bead.

In some embodiment of the present disclosure, there are a plurality of lamp beads, and the lamp beads are distributed around a center of the spotlight cup. By the above technical solution, the plurality of light beads are surrounded and distributed, the light becomes more uniform.

The present application has the following technical effects.

The present disclosure can move the lunar image around the center of the blocking piece through the imaging lens. When the lunar image is completely occluded, a lunar eclipse effect is formed, and when the lunar image is partially occluded, a crescent or a half-moon display effect can be formed. Furthermore, due to a driving force of the rotary drive component, the lunar image is constantly changed, thus achieving a dynamic lunar eclipse display effect, the display effect is vivid, and meeting people's growing personalized needs.

BRIEF DESCRIPTION OF DRAWINGS

In order to provide a clearer explanation of the embodiments or technical solutions in the present application or existing technology, a brief introduction will be given to the accompanying drawings required for the embodiments or existing technology. It is obvious that the accompanying drawings described below are only some embodiments of the present application. For those skilled in the art, other drawings can be obtained based on these drawings without creative work.

FIG. 1 is a front view of the present application.

Numeral reference: 1 blocking piece; 101 circular opaque area; 102 transparent area; 2 imaging lens; 3 gear plate; 4 Fresnel lens; 5 fixing ring; 6 spotlight lens; 7 spotlight cup; 8 lamp bead; 9 motor; 10 transmission gear; 11 reduction gear; 12 bracket; 13 aluminum substrate.

DESCRIPTION OF EMBODIMENTS

In order to render the above objectives, features, and advantages of the present application more obvious and understandable, a detailed explanation of the specific implementation of the present application will be provided below in combination with the accompanying drawings. Many specific details are elaborated in the following description to facilitate a thorough understanding of the present application. However, the present application can be implemented in many different ways from the described herein, and those skilled in the art can make similar improvements without departing from the scope of the present application. Therefore, the present application is not limited by the specific embodiments disclosed below.

Embodiment 1

Figure 1:
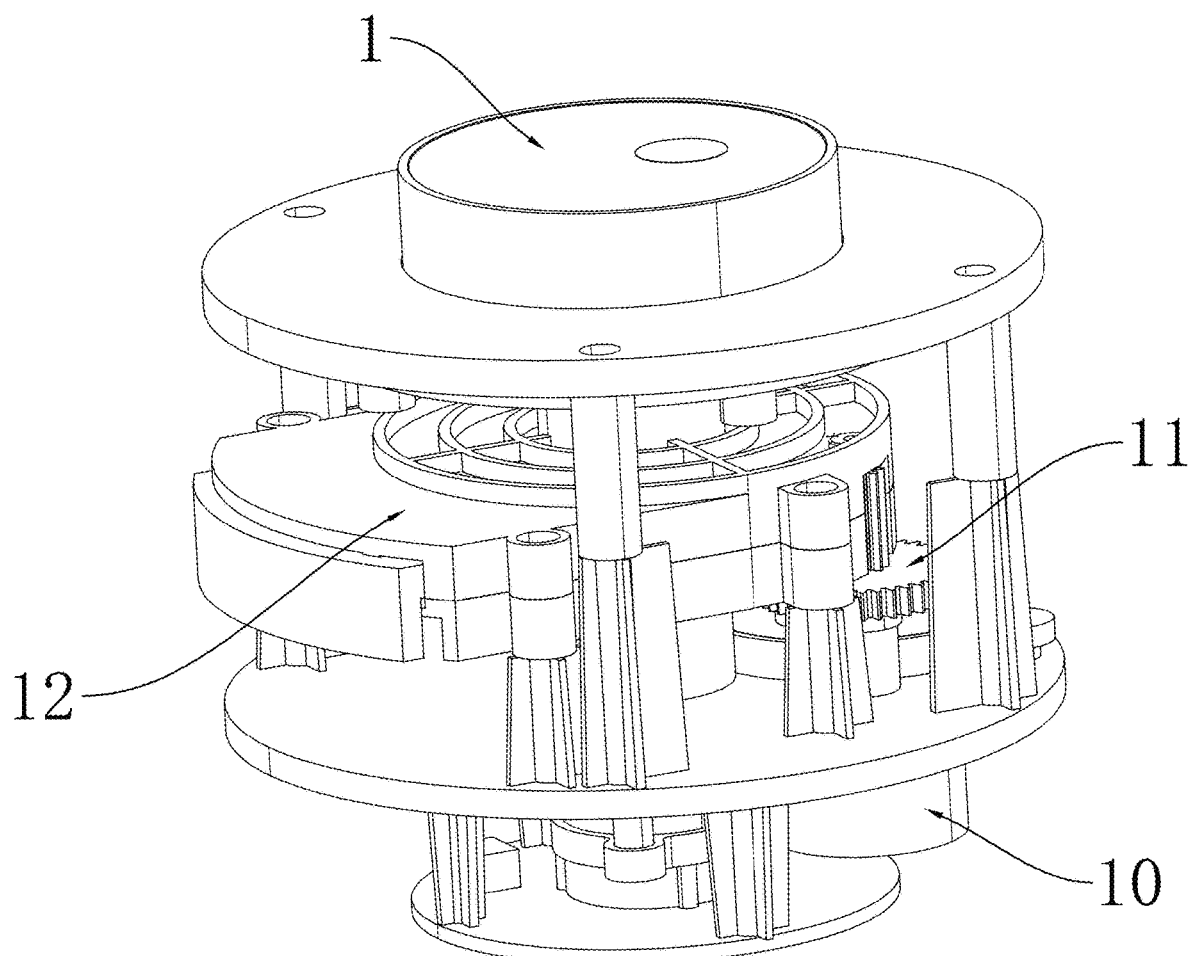
Figure 2:
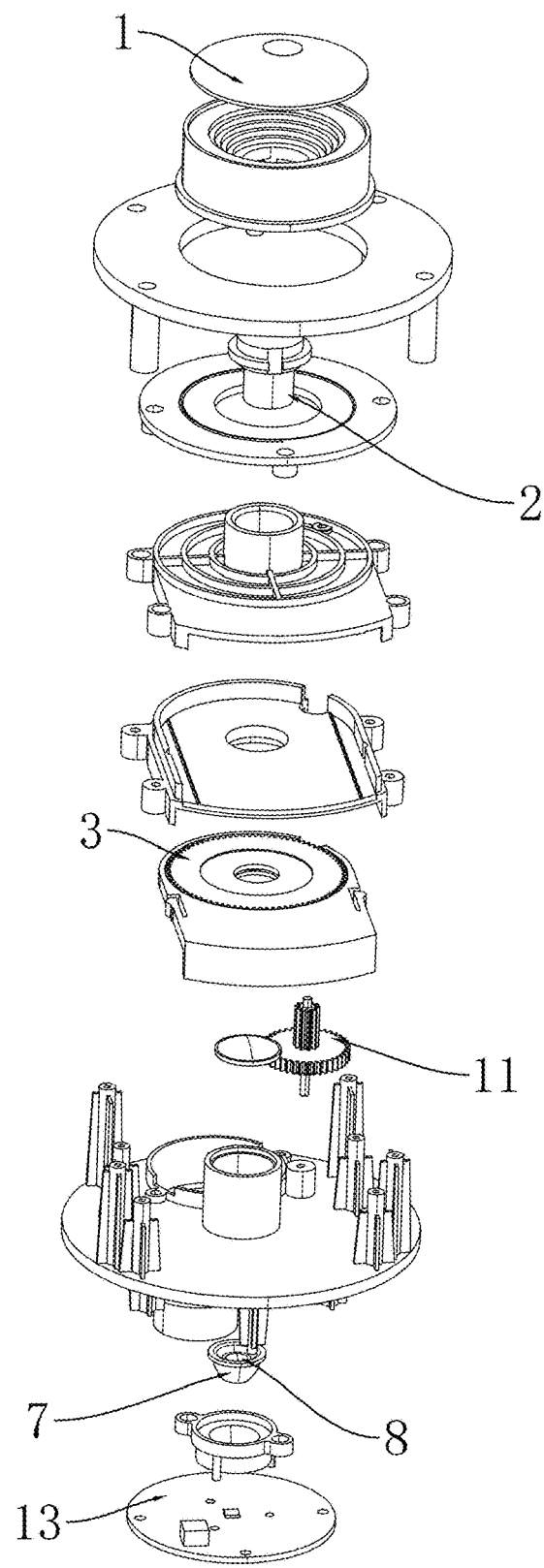
FIG. 2 is an exploded view in the present application.
Figure 3:
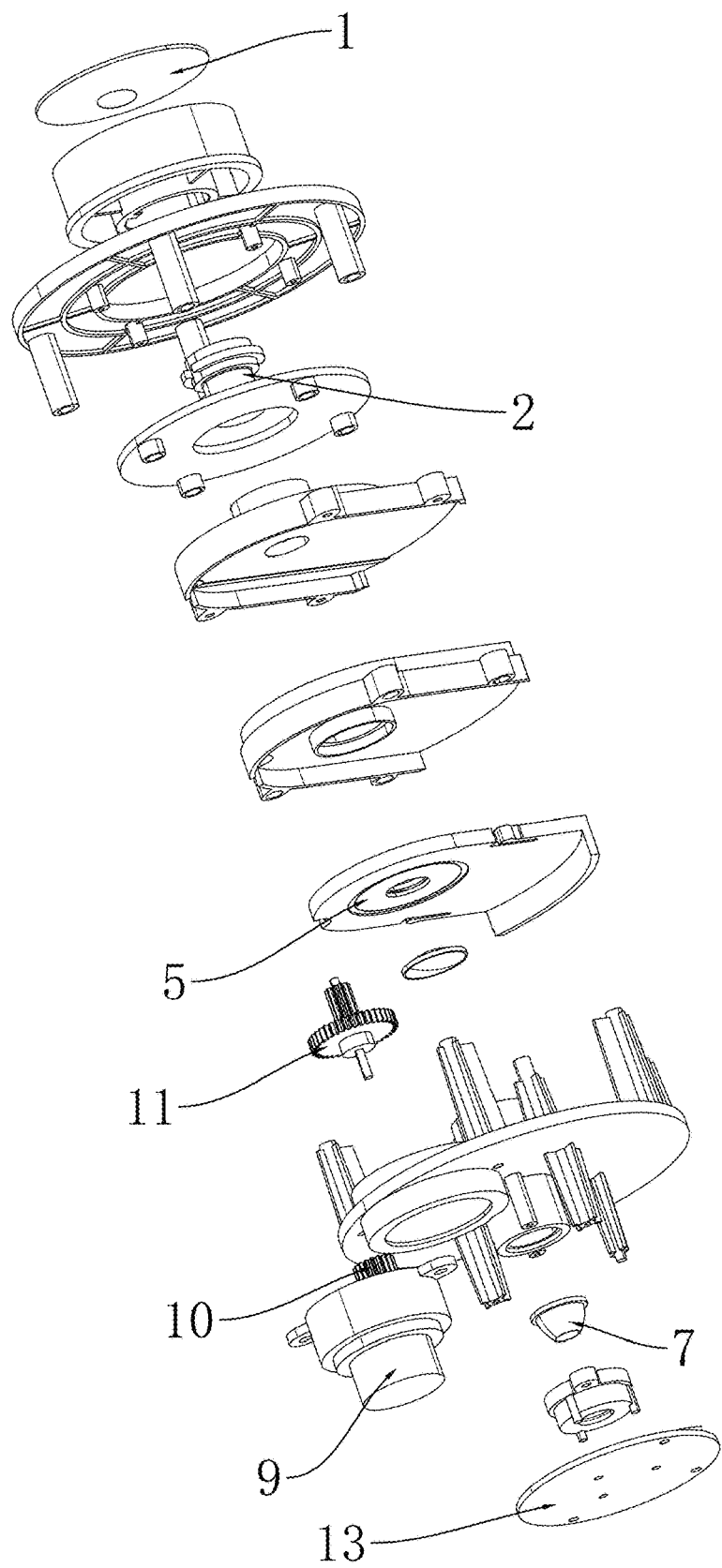
FIG. 3 is another exploded view of the present application.
Figure 4:
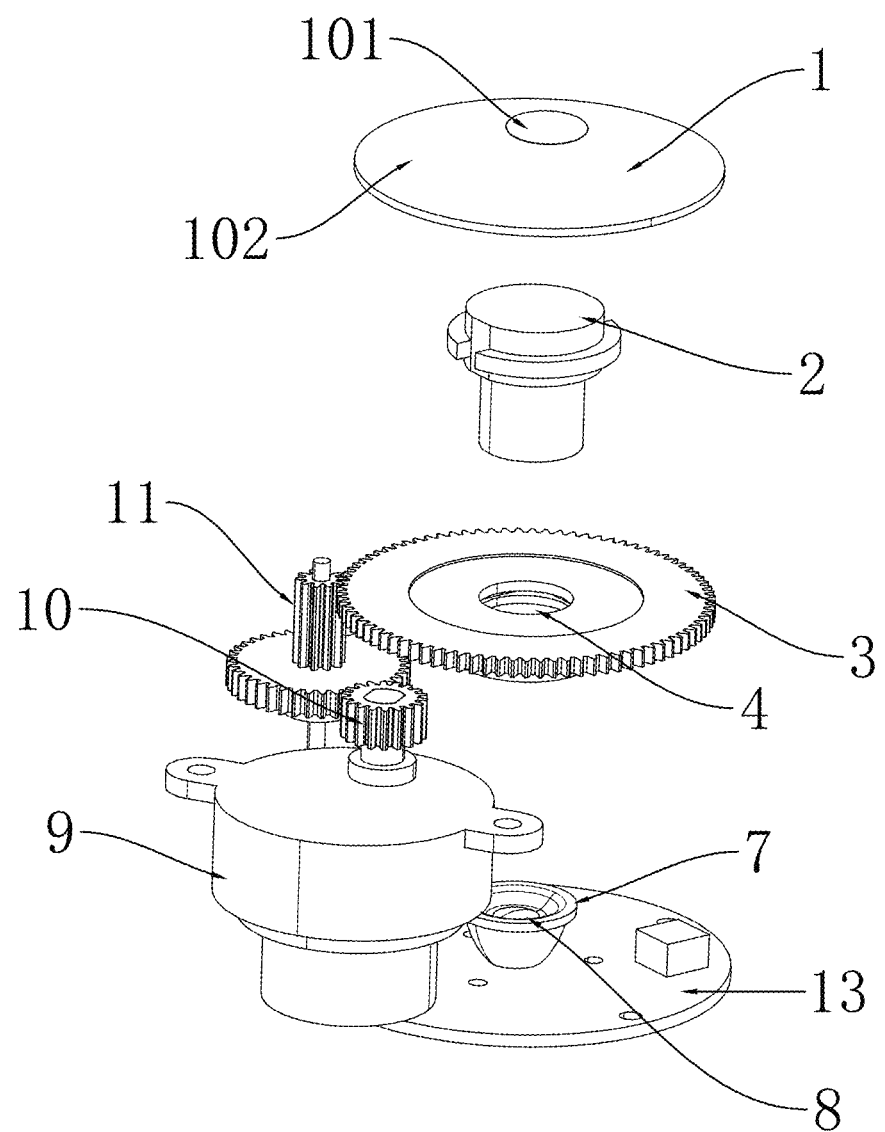
FIG. 4 is an internal structural diagram of the present application.
Figure 5:
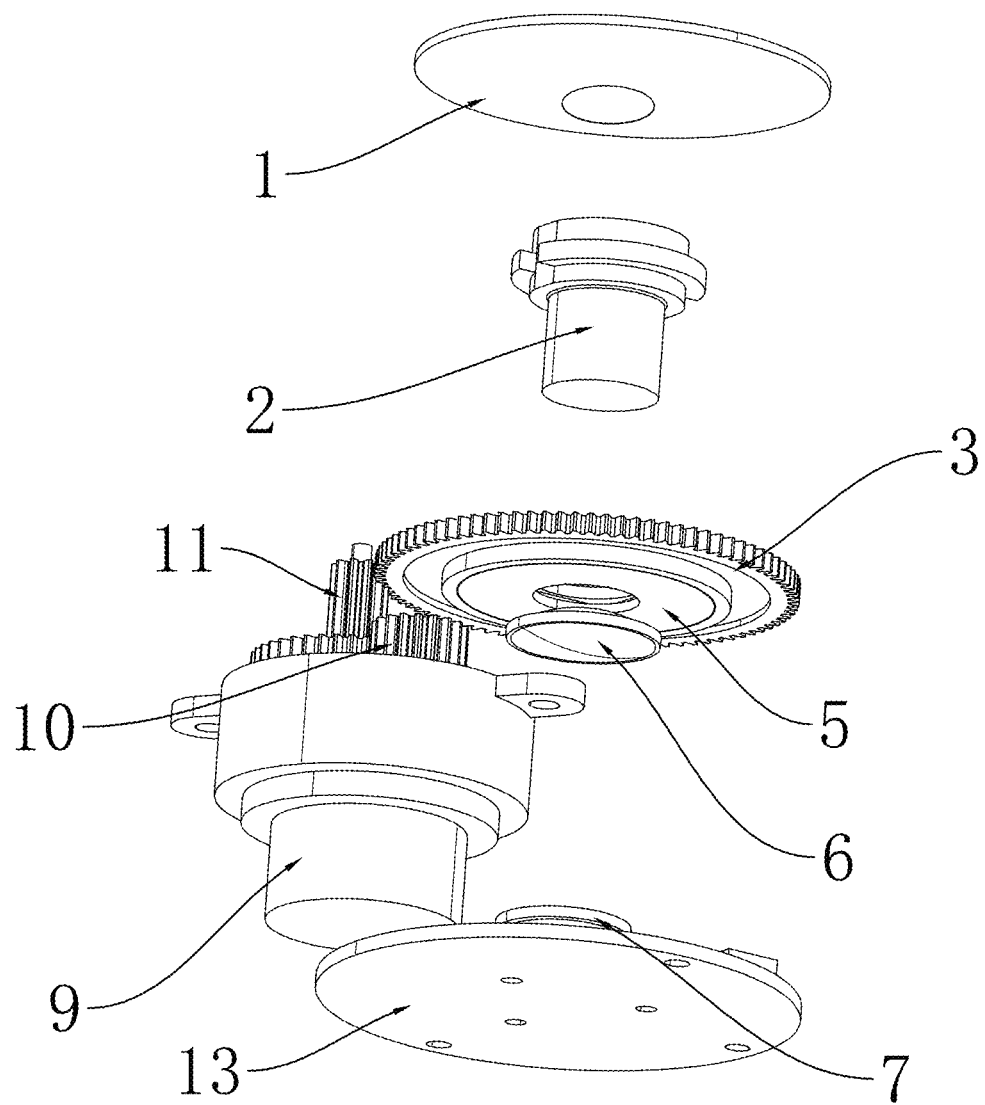
FIG. 5 is another internal structural diagram of the present application.

In this embodiment of the present application, as shown in FIGS. 1-5, a dynamic lunar eclipse lamp is provided, which includes a blocking piece 1. The blocking piece 1 includes a transparent area 102 and a circular opaque area 101, the opaque area 101 is provided at a non-central position of the blocking piece 1.

The dynamic lunar eclipse lamp further includes an imaging lens 2, the imaging lens 2 is provided on one side of the blocking piece 1. One end of the imaging lens 2 is provided with a Fresnel lens 4 configured to image, and an image is provided at a non-central position on the Fresnel lens 4. The imaging lens 2 is configured to project the image onto a non-central position on the blocking piece 1, and a position of the image projected by the imaging lens 2 corresponds to a position of the opaque area 101 on the blocking piece 1.

The dynamic lunar eclipse lamp further includes a rotary drive component, which is connected to the Fresnel lens 4. The rotary drive component is configured to drive the Fresnel lens 4 to rotate. The rotary drive component can be implemented by a gear transmission, a belt transmission, or screw transmission; and the dynamic lunar eclipse lamp further includes a light source component configured to project a light spot onto the Fresnel lens 4.

On the Fresnel lens 4, an image containing a moon is provided. When the rotary drive component drives the Fresnel lens 4 to rotate, the moon image on it can be moved around because it is at the non-central position. Through the imaging lens 2, the moon image can be moved around a center of the blocking piece 1. Since the position of the image projected by the imaging lens 2 corresponds to the position of the opaque area 101 on the blocking piece 1, the moon image can overlap with the opaque area 101 during rotation. When the moon image completely overlaps with the opaque area 101, it is completely blocked, thereby forming a lunar eclipse effect. When the moon image partially overlaps with the opaque area 101, it can form a crescent or a half-moon display effect. This effect is also constantly changed due to a driving of the rotary drive component, thus achieving a dynamic lunar eclipse display effect, rendering the display effect vivid, and satisfying people's growing personalized needs.

The rotary drive component includes a gear plate 3, and the gear plate 3 is rotatably connected to a bracket 12, the gear plate 3 is connected to a motor 9 through gear transmission. The Fresnel lens 4 is fixed on the gear plate 3 through a fixing ring 5, and the motor 9 drives the gear plate 3 to rotate through the gear transmission, which in turn drives the Fresnel lens 4 to rotate, thus achieving a rotation of the lunar image. The Fresnel lens 4 is lightweight and has small size, so driving the Fresnel lens 4 to rotate further reduces energy consumption.

There is a through hole in a middle of the gear plate 3, and Fresnel lens 4 is fixed at a position of the through hole. The Fresnel lens 4 is located at a middle of the gear plate 3, and the Fresnel lens 4 is more stable.

One side of the gear plate 3 is meshed and connected with a reduction gear 11, and the reduction gear 11 includes a small diameter gear and a large diameter gear with a coaxial integrated structure. The small diameter gear is meshed with the gear plate 3, and the large diameter gear is meshed with a transmission gear 10; the transmission gear 10 is connected to an output shaft of the motor 9. By the reduction gear 11 and the transmission gear 10, the motor 9 can stably drive the gear plate 3 to rotate, with smooth transmission, compact structure, reliable operation, and long service life.

The light source component includes a spotlight lens 6, and the spotlight lens 6 is located on one side of the Fresnel lens 4. One side of the spotlight lens 6 is provided with a lamp bead 8, and the lamp bead 8 uses 3535 white light beads. The spotlight lens 6 is configured to gather light from the lamp bead 8 and project it onto the Fresnel lens 4, thereby forming a circular spot with a diameter of 11 mm on the Fresnel lens 4.

One side of the spotlight lens 6 is provided with a spotlight cup 7, and the lamp bead 8 is provided in a middle of the spotlight cup 7. The spotlight cup 7 is configured to gather the light from the lamp bead 8 and project gathered light onto the spotlight lens 6. The spotlight lens 6 and the spotlight cup 7 are cooperated to perform a second focusing, which can form a more stable spot effect.

The lamp bead 8 is fixedly installed on an aluminum substrate 13, and the aluminum substrate 13 is configured to carry the lamp bead 8 and help dissipate heat from the lamp bead 8.

Embodiment 2

Embodiment 2 is an improvement based on Embodiment 1. In order to achieve higher brightness, there are a plurality of lamp beads 8 in this embodiment of the present application, and the lamp beads 8 are distributed around a center of the spotlight cup 7. There are three lamp beads 8, and the number of the lamp beads 8 is not limited. They can be set according to needs. More lamp beads 8 produce higher brightness or fewer lamp beads 8 are more energy-efficient, and the surrounding distribution renders the light more uniform.

Working principle: the light source is emitted from the lamp bead 8 and is first focused by the spotlight cup 7. After reducing the angle of the light source, the light passes through the spotlight lens 6 for a second focusing. After the second focusing, the light is focused by the spotlight lens 6 onto the Fresnel lens 4, thereby forming a circular spot on the Fresnel lens 4. Then, the spot illuminates the lunar image on the Fresnel lens 4, passes through the imaging lens 2, and finally projects the lunar image on the Fresnel lens 4 onto the blocking piece 1.

During the process, the motor 9 can drive the Fresnel lens 4 to rotate through the gear plate 3. The moon image on the Fresnel lens 4 is at the non-central position and is moved around the center of the blocking piece 1 through the imaging lens 2. Since the position of the image projected by the imaging lens 2 corresponds to the position of the opaque area 101 on the blocking piece 1, the moon image can overlap with the opaque area 101 during rotation. When the moon image completely overlaps with the opaque area 101, it is completely occluded, thereby forming a lunar eclipse effect. When the moon image partially overlaps with the opaque area 101, it can form a crescent or a half-moon display effect. This effect also be continuously changed due to the driving of the rotary drive component, thus achieving a dynamic lunar eclipse display effect.

The above is only preferred embodiments of the present application and does not limit the present application in any form. Those skilled in the art may use the methods and technical content disclosed above to make many possible changes and modifications to the technical solution of the present application, or modify it into equivalent embodiments with equivalent changes, without departing from the scope of the technical solution of the present application. Therefore, any equivalent changes made based on the shape, structure, and principle of the present application that do not deviate from the technical solution of the present application should be covered within the protection scope of the present application.

What is claimed is:

1. A dynamic lunar eclipse lamp, comprising:
   a blocking piece comprising a transparent area and a circular opaque area, wherein the opaque area is provided at a non-central position of the blocking piece;
   an imaging lens provided on one side of the blocking piece, and one end of the imaging lens is provided with a Fresnel lens configured to image, a non-central position of the Fresnel lens is provided with an image, and the imaging lens is configured to project the image onto a non-central position on the blocking piece;
   a rotary drive component, which is connected to the Fresnel lens and configured to drive the Fresnel lens to rotate; and
   a light source component configured to project a light spot onto the Fresnel lens.

2. The dynamic lunar eclipse lamp according to claim 1, wherein the rotary drive component comprises a gear plate, the gear plate is rotatably connected to a bracket, and the gear plate is connected to a motor through gear transmission;
   the Fresnel lens is fixed on the gear plate through a fixing ring.

3. The dynamic lunar eclipse lamp according to claim 2, wherein a middle of the gear plate is provided with a through hole, and the Fresnel lens is fixed at a position of the through hole.

4. The dynamic lunar eclipse lamp according to claim 2, wherein one side of the gear plate is meshed and connected with a reduction gear;
   the reduction gear comprises a small diameter gear and a large diameter gear of a coaxial integrated structure,
   wherein the small diameter gear is meshed and connected with the gear plate, and the large diameter gear is meshed and connected with a transmission gear,
   the transmission gear is connected to an output shaft of the motor.

5. The dynamic lunar eclipse lamp according to claim 1, wherein the light source component comprises a spotlight lens,
   the spotlight lens is provided on one side of the Fresnel lens,
   one side of the spotlight lens is provided with a lamp bead, and the spotlight lens is configured to gather light of the lamp bead.

6. The dynamic lunar eclipse lamp according to claim 5, wherein one side of the spotlight lens is provided with a spotlight cup, and the lamp bead is provided in a middle of the spotlight cup.

7. The dynamic lunar eclipse lamp according to claim 5, wherein the lamp bead is fixedly installed on an aluminum substrate.

8. The dynamic lunar eclipse lamp according to claim 5, wherein there are a plurality of lamp beads, and the lamp beads are distributed around a center of the spotlight cup.

* * * * *